United States Patent
Douros et al.

(10) Patent No.: US 8,205,113 B2
(45) Date of Patent: Jun. 19, 2012

(54) FAULT TOLERANT BATCH PROCESSING

(75) Inventors: Bryan Phil Douros, Framingham, MA (US); Matthew Darcy Atterbury, Lexington, MA (US); Tim Wakeling, Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 48 days.

(21) Appl. No.: 12/502,851

(22) Filed: Jul. 14, 2009

(65) Prior Publication Data
US 2011/0016354 A1 Jan. 20, 2011

(51) Int. Cl.
*G06F 11/00* (2006.01)

(52) U.S. Cl. .............................. 714/15; 714/16; 714/20

(58) Field of Classification Search .................... 714/15, 714/16, 20
See application file for complete search history.

(56) References Cited

U.S. PATENT DOCUMENTS

| 5,819,021 | A |  | 10/1998 | Stanfill et al. |
|---|---|---|---|---|
| 5,966,072 | A |  | 10/1999 | Stanfill et al. |
| 6,154,877 | A |  | 11/2000 | Ramkumar et al. |
| 6,584,581 | B1 | * | 6/2003 | Bay et al. ......................... 714/16 |
| 7,164,422 | B1 |  | 1/2007 | Wholey, III et al. |
| 7,167,850 | B2 |  | 1/2007 | Stanfill |
| 7,634,687 | B2 | * | 12/2009 | Haselden et al. ............... 714/15 |
| 7,873,859 | B2 | * | 1/2011 | Smith et al. ........................ 714/2 |
| 7,890,800 | B2 | * | 2/2011 | Weiberle et al. ................. 714/15 |
| 7,900,015 | B2 | * | 3/2011 | Fachan et al. .................. 711/172 |
| 2001/0042224 | A1 | * | 11/2001 | Stanfill et al. ................... 714/16 |
| 2002/0188653 | A1 | * | 12/2002 | Sun .............................. 709/201 |
| 2005/0034014 | A1 | * | 2/2005 | Moser et al. .................... 714/17 |
| 2005/0114369 | A1 |  | 5/2005 | Gould et al. |
| 2005/0256826 | A1 | * | 11/2005 | Hambrick et al. ................ 707/1 |
| 2005/0283665 | A1 | * | 12/2005 | Levering et al. ................ 714/21 |
| 2006/0095466 | A1 |  | 5/2006 | Stevens et al. |
| 2006/0136279 | A1 | * | 6/2006 | Maybee et al. .................... 705/9 |
| 2007/0271381 | A1 | * | 11/2007 | Wholey et al. ................ 709/226 |
| 2008/0005227 | A1 | * | 1/2008 | Subbian ......................... 709/203 |
| 2008/0049022 | A1 |  | 2/2008 | Sherb et al. |
| 2008/0256014 | A1 |  | 10/2008 | Gould et al. |
| 2008/0307258 | A1 | * | 12/2008 | Challenger et al. ............. 714/20 |
| 2009/0083313 | A1 |  | 3/2009 | Stanfill et al. |

OTHER PUBLICATIONS

International Search Report & Written Opinion issued in PCT application No. PCT/US10/41791, mailed Sep. 1, 2010, 10 pages.

* cited by examiner

*Primary Examiner* — Marc Duncan
(74) *Attorney, Agent, or Firm* — Fish & Richardson P.C.

(57) ABSTRACT

Among other aspects disclosed are a method and system for processing a batch of input data in a fault tolerant manner. The method includes reading a batch of input data including a plurality of records from one or more data sources and passing the batch through a dataflow graph. The dataflow graph includes two or more nodes representing components connected by links representing flows of data between the components. At least one but fewer than all of the components includes a checkpoint process for an action performed for each of multiple units of work associated with one or more of the records. The checkpoint process includes opening a checkpoint buffer stored in non-volatile memory at the start of processing for the batch. For each unit of work from the batch, if a result from performing the action for the unit of work was previously saved in the checkpoint buffer, the saved result is used to complete processing of the unit of work without performing the action again. If a result from performing the action for the unit of work is not saved in the checkpoint buffer. The action is performed to complete processing of the unit of work and the result from performing the action is saved in the checkpoint buffer.

16 Claims, 4 Drawing Sheets

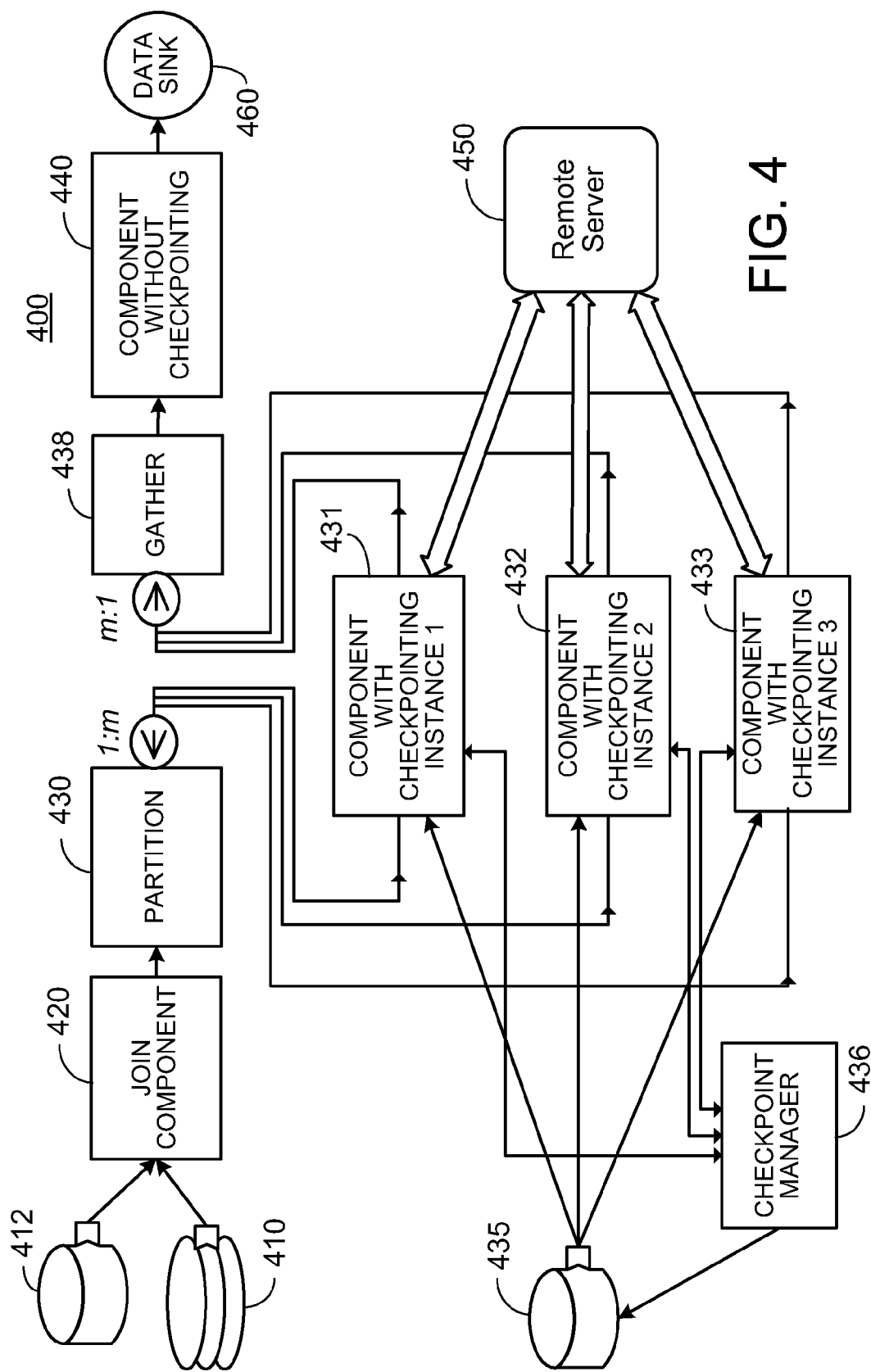

FAULT TOLERANT BATCH PROCESSING

TECHNICAL FIELD

This description relates to processing batches of data in a fault tolerant manner.

BACKGROUND

Complex computations can often be expressed a directed graph (called a "dataflow graph"), with components of the computation being associated with the nodes (or vertices) of the graph and data flows between the components corresponding to links (or arcs, edges) between the nodes of the graph. The components include data processing components that process the data and components that act as a source or sink of the data flows. The data processing components form a pipelined system that can process data in multiple stages concurrently. A system that implements such graph-based computations is described in U.S. Pat. No. 5,966,072, EXECUTING COMPUTATIONS EXPRESSED AS GRAPHS. In some cases, a graph-based computation is configured to receive a flow of input data and process the continuous flow of data to provide results from one or more of the components indefinitely until the computation is shut down. In some cases, a graph-based computation is configured to receive a batch of input data and process the batch of data to provide results for that batch, and then shut down or return to an idle state after the batch has been processed.

SUMMARY

In one aspect, in general, a method for processing a batch of input data in a fault tolerant manner includes: reading a batch of input data including a plurality of records from one or more data sources; and passing the batch through a dataflow graph including two or more nodes representing components connected by links representing flows of data between the components, wherein at least one but fewer than all of the components includes a checkpoint process for an action performed for each of multiple units of work associated with one or more of the records. The checkpoint process includes: opening a checkpoint buffer stored in non-volatile memory at the start of processing for the batch; and for each unit of work from the batch, if a result from performing the action for the unit of work was previously saved in the checkpoint buffer, using the saved result to complete processing of the unit of work without performing the action again, or if a result from performing the action for the unit of work is not saved in the checkpoint buffer, performing the action to complete processing of the unit of work and saving the result from performing the action in the checkpoint buffer.

Aspects can include one or more of the following features.

The action includes communicating with a remote server.

The result from performing the action includes information from communication with the remote server for the unit of work.

The method further includes deleting the checkpoint buffer when the processing of the batch is complete.

Communications with the remote server are tolled.

The results of communications with the remote server are stored in volatile memory and saved to the checkpoint buffer in groups upon the occurrence of trigger events.

The trigger event is a signal from a checkpoint manager.

The trigger event is the processing of a number of records since the last write to the checkpoint buffer.

The trigger event is the elapse of a period of time since the last write to the checkpoint buffer.

A component that includes the checkpoint process runs on a plurality of processing devices in parallel.

The allocation of data records among the plurality of parallel processing devices is consistent between runs of the batch and each processing device maintains an independent checkpoint buffer.

The allocation of data records among the plurality of parallel processing devices is dynamic and the processing devices share access to a single checkpoint buffer stored in shared non-volatile memory with writes to the checkpoint buffer controlled by a checkpoint manager.

The method further includes restarting all the components in the dataflow graph after a fault condition has occurred; reading the batch of input data including a plurality of records from one or more data sources; and passing the entire batch through the dataflow graph.

The action includes communicating with a remote server.

In another aspect, in general, a computer-readable medium stores a computer program for processing a batch of input data in a fault tolerant manner. The computer program includes instructions for causing a computer to: read a batch of input data including a plurality of records from one or more data sources; and pass the batch through a dataflow graph including two or more nodes representing components connected by links representing flows of data between the components, wherein at least one but fewer than all of the components includes a checkpoint process for an action performed for each of multiple units of work associated with one or more of the records. The checkpoint process further includes: opening a checkpoint buffer stored in non-volatile memory at the start of processing for the batch; and for each unit of work from the batch, if a result from performing the action for the unit of work was previously saved in the checkpoint buffer, using the saved result to complete processing of the unit of work without performing the action again, or if a result from performing the action for the unit of work is not saved in the checkpoint buffer, performing the action to complete processing of the unit of work and saving the result from performing the action in the checkpoint buffer.

In another aspect, in general, a system for processing a batch of input data in a fault tolerant manner includes: means for receiving a batch of input data including a plurality of records from one or more data sources; and means for passing the batch through a dataflow graph including two or more nodes representing components connected by links representing flows of data between the components, wherein at least one but fewer than all of the components includes a checkpoint process for an action performed for each of multiple units of work associated with one or more of the records. The checkpoint process includes: opening a checkpoint buffer stored in non-volatile memory at the start of processing for the batch; and for each unit of work from the batch, if a result from performing the action for the unit of work was previously saved in the checkpoint buffer, using the saved result to complete processing of the unit of work without performing the action again, or if a result from performing the action for the unit of work is not saved in the checkpoint buffer, performing the action to complete processing of the unit of work and saving the result from performing the action in the checkpoint buffer.

Aspects can include one or more of the following advantages: The need for some checkpoint related communications between different components in the dataflow graph can be obviated The repeat of complex or costly steps in multi-step batch process during fault recovery can be selectively avoided without the complexity and expense of implementing checkpointing of the entire pipelined system. For example, this method may be used to save money by avoiding repeated calls to a tolled service.

Other features and advantages of the invention will become apparent from the following description, and from the claims.

DESCRIPTION OF DRAWINGS

FIG. 4 is a block diagram of a batch data processing system with input/output checkpointing with parallelism and a checkpoint manager.

DESCRIPTION

A graph-based data processing system can be configured to process a batch of input data in a fault tolerant manner including saving the intermediate results of one component in a dataflow graph to a buffer from which they can be retrieved and reused in the event that a fault condition forces a restart of the processing of a batch of input data.

Figure 1:
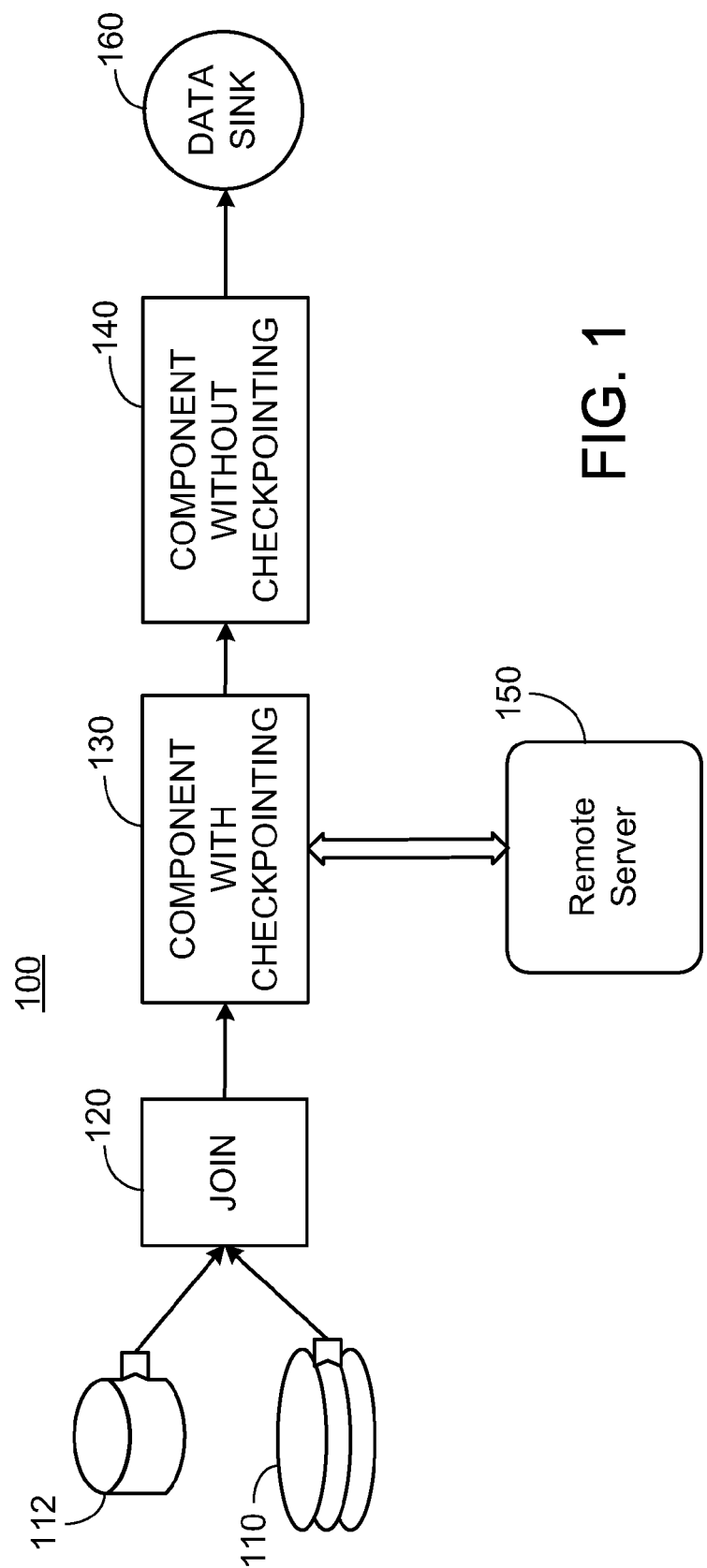
FIG. 1 is a block diagram of a batch data processing system with input/output checkpointing.

FIG. 1 is a block diagram of an exemplary data processing system 100. Data is passed through a sequence of data processing components of a dataflow graph that processes a flow of data from one or more data sources to one or more data sinks. Any of the various data processing components in the dataflow graph can be implemented by processes running on separate processing devices, or multiple data processing components may be implemented by one or more processes running on a single processing device. Data may be processed in batches that identify a set of input data records to be processed by the system 100.

The processing of a batch of data by the system 100 may be initiated by user input or some other event, such as the expiration of a timer. When processing of a batch of data is started, input data records are read from one or more input data sources. For example, the input data may be read from one or more files stored on a computer-readable storage device, such as represented by data storage component 110. Input data records may also be read from a database running on a server, such as represented by data storage component 112. A join component 120 reads data (e.g., records) from multiple data sources in a sequence and arranges the input data into a sequence of discrete work units. The work units may represent records stored in a predetermined format based on input records, for example, or may represent transactions to be processed, for example. In some implementations, each work unit may be identified by a number that is unique within the batch, such as a count of work units processed. The work units are then passed in sequence to the next component in the dataflow graph.

The exemplary dataflow graph implementing the system 100 also includes data processing components 130 and 140. The data processing component 130 includes a checkpoint process, which regularly saves state information about its processing to non-volatile memory during the course of batch processing. When a fault condition occurs and a batch must be restarted, the checkpointed component 130 accesses the stored state information to reduce the amount of processing that must be repeated during a repeat run of the batch. Thus, checkpointing provides fault tolerance at the cost of using the non-volatile memory resource and adding complexity to the data processing component 130. The data processing component 140 is a component without checkpointing. Other dataflow graphs could include more or fewer data processing components. As many of the data processing components as necessary may be configured to include checkpoint processes. Typically, components with high costs in terms of delay or some other metric are configured to include checkpoint processes, so that in the event of a fault condition, the high cost processing steps in the system 100 need not be repeated for all work units in the batch.

The data processing component 130 includes the step of accessing a remote server 150. For each work unit processed, the first processing component 130 will send a request to the remote server 150 and receive a result (e.g., data from a database) from the remote server. Such an operation can be costly for various reasons including network delays experienced in communicating with the remote server or tolling of services provided by the remote server. After receiving the result, the component 130 generates output for the next data processing component 140. Since this component 130 has been configured to include a checkpoint process, it saves the results from the remote server 150 as part of the processing state information before completing processing by passing the output for the work unit to the next data processing component 140 and starting processing of the next work unit. The processing state information may be temporarily stored in volatile memory on the processing device running the checkpoint process. At regular times the processing state information for one or more work units is written to a checkpoint buffer stored in non-volatile memory, so that it will be available later in the event of a fault condition.

As work units make their way through the data processing components of the dataflow graph, the final results associated with each work unit are transferred to a data sink 160. The work units can be transferred individually, or in some implementations the work units can be used to incrementally update a final result, or can be accumulated (e.g., in a queue), before the final results are transferred to the data sink 160. The data sink 160 can be a data storage component that stores the work units or some accumulated output based on the work units, for example, or the data sink 160 can be a queue to which the work units are published, or some other type of sink for receiving the final results. The batch processing ends when the results for all work units in the batch have been transferred to the data sink 160. At this point, the components in the dataflow graph may be terminated. A checkpoint process associated with a checkpointed component may delete its checkpoint buffer as part of its termination routine.

Figure 2:
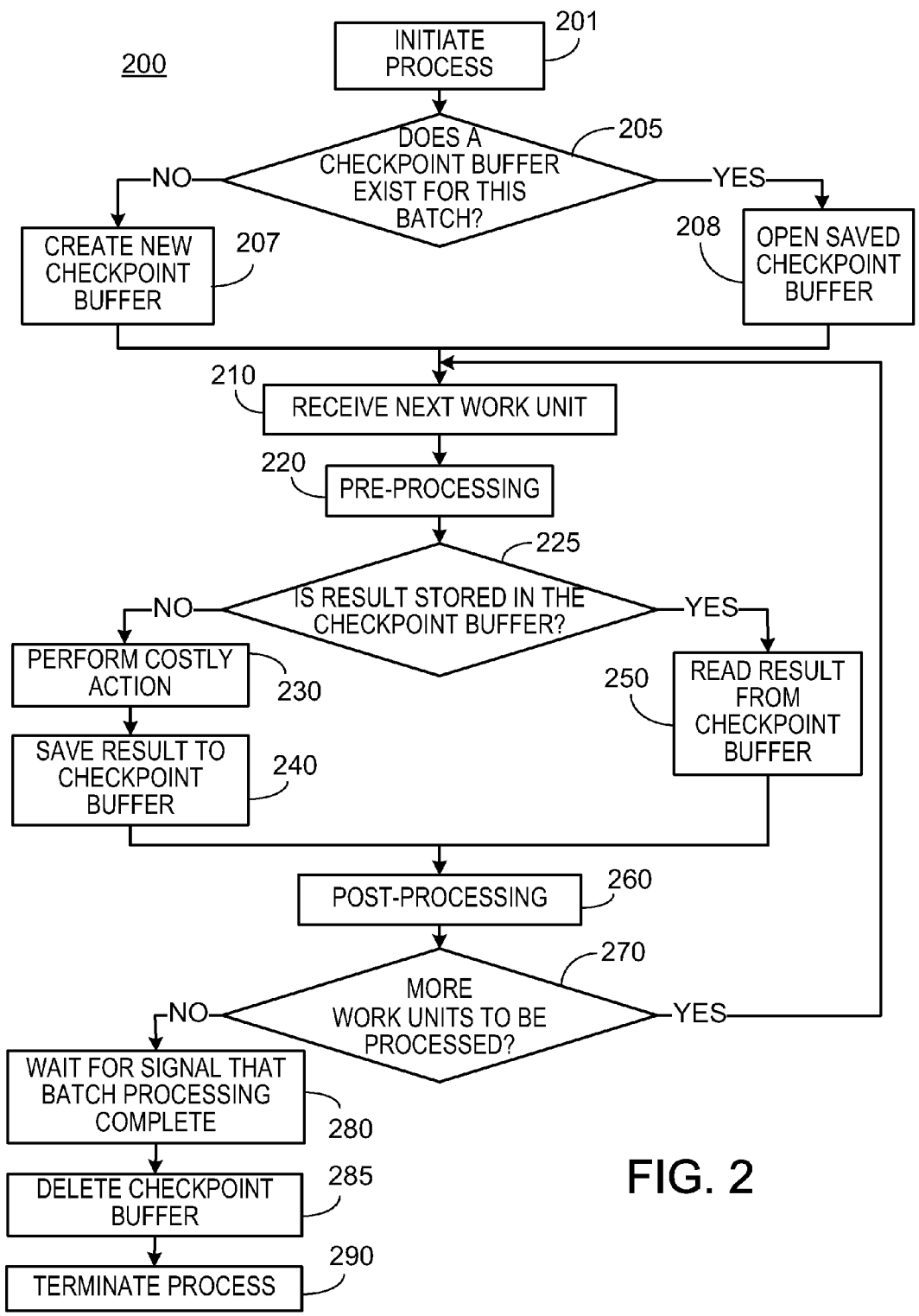
FIG. 2 is a flowchart of a checkpoint process.

FIG. 2 is a flowchart of an exemplary process 200 for checkpointing a checkpointed component. The process 200 starts up 201, for example, upon an external call from software implementing batch processing through a dataflow graph. Start-up may include allocating volatile memory for the process 200 on the processing device that the checkpointed component runs on and reserving any other required resources. The process 200 next checks 205 whether a checkpoint buffer associated with this process already is saved in non-volatile memory. If no checkpoint buffer exists, a new checkpoint buffer is created 207 in non-volatile memory. If a checkpoint buffer was previously stored, it is opened 208. Opening 208 the checkpoint buffer may include finding the location of the checkpoint buffer in non-volatile memory or possibly copying all or part the checkpoint buffer to volatile memory on the processing device.

At the beginning of a loop for handling each work unit, input data associated with a work unit is received 210 from a previous component in the dataflow graph or from a source.

Pre-processing 220 is optionally performed for the work unit. Pre-processing 220 may include, for example, reformatting a data record or determining a value that may be used to search the checkpoint buffer for a result associated with the work unit. The checkpoint buffer of the checkpoint process 200 is checked 225 to determine if the result for this work unit is stored in the checkpoint buffer (e.g., from a previous processing of the batch that was interrupted).

If the associated result is not stored in the checkpoint buffer, processing including a costly action 230 is performed for the work unit. An example of a costly action could include accessing resources on a remote server across a network and incurring significant delay or tolling charges. The results of this processing are then stored 240 in the checkpoint buffer. The results can be associated with the work unit being processed using an incrementing counter, for example, that identifies the work unit and its associated result by the same counter value. The results may be written directly to non-volatile memory, or may be temporarily buffered in volatile memory until a triggering event causes it to be copied to non-volatile memory. Exemplary triggering events include processing a fixed number of work units, an elapsed period of time, or a signal from an external process.

If the associated result is stored in the checkpoint buffer, the result is retrieved 250 from the checkpoint buffer.

Post-processing 260 is optionally performed to complete processing of the work unit. Post-processing 260 may include reformatting data or passing data to the next component in a dataflow graph, for example. After processing of a work unit is complete the checkpoint process 200 next checks 270 whether another work unit remains to be processed. If another work unit is available, the checkpoint process 200 loops back to read the input data associated with the next work unit. When no more work units remain to be processed, the checkpoint process 200 waits 280 for an external signal indicating that the batch processing has been completed and instructing it to terminate. When the termination signal is received, the checkpoint process 200 deletes 285 its checkpoint buffer from non-volatile memory, before completing its termination sequence 290. Completing the termination sequence 290 may include releasing volatile memory on the processing device or other reserved resources.

Figure 3:
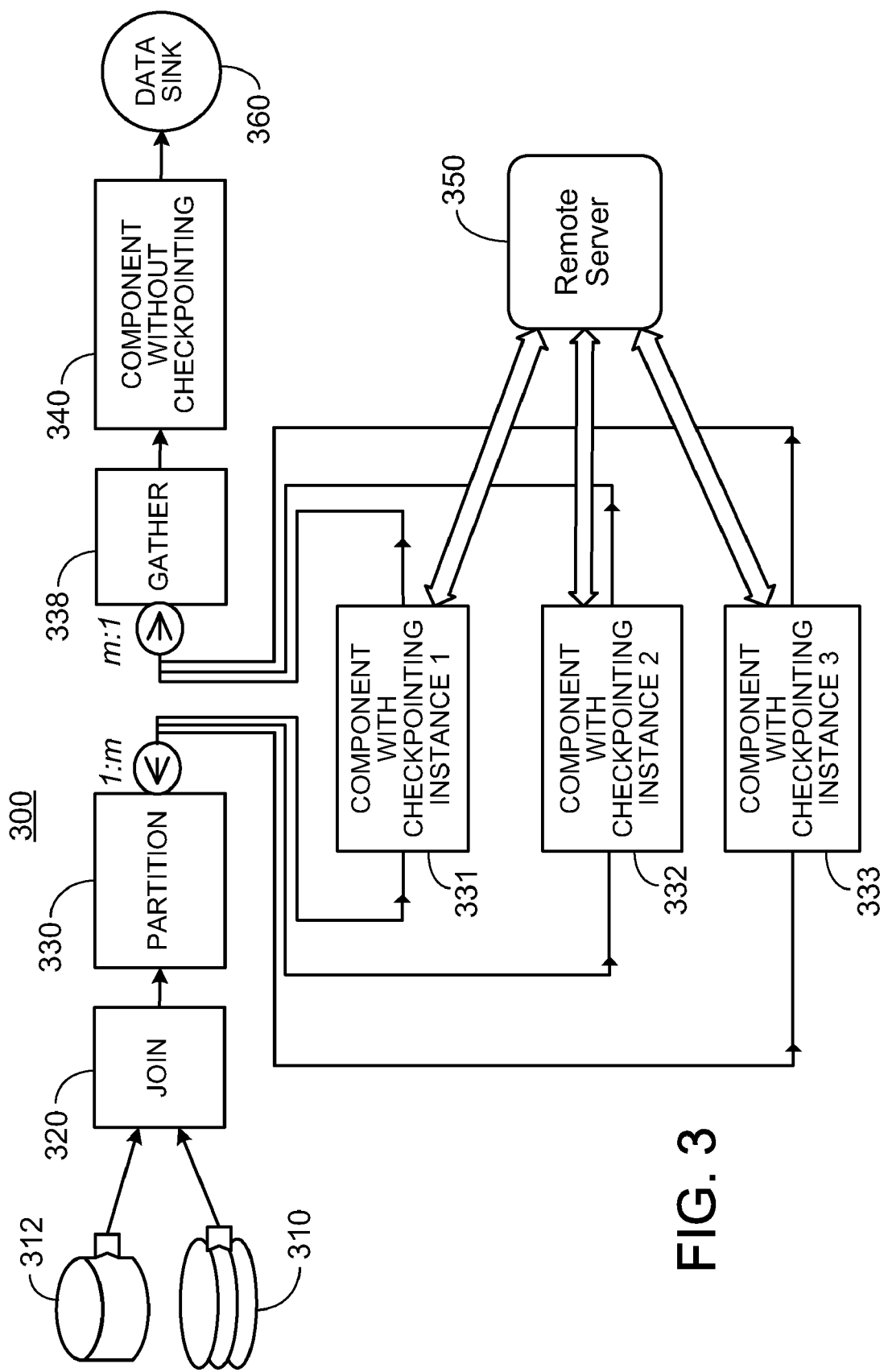
FIG. 3 is a block diagram of a batch data processing system with input/output checkpointing with parallelism.

FIG. 3 is a block diagram of an exemplary data processing system 300 in which a dataflow graph implementing the system 300 includes a parallel component with distributed checkpoint processing. One or more components in the dataflow graph may be run on multiple processing devices (e.g., multiple computers or multiple processors or processor cores of a parallel processor) in parallel. In this example, multiple instances 331, 332, 333 of a checkpointed parallel component are explicitly depicted. An instance of the parallel component is run on each processing device and each instance processes a subset of the work units in a batch. In this example of a distributed checkpointing approach, a different checkpoint process is run for each of the three instances of the parallel component.

When processing of a batch of data is started, input data records are read from one or more input data sources. For example, the input data may be read from one or more files stored on a computer-readable storage device, such as represented by data storage component 310. Input data records may also be read from a database running on a server, such as represented by data storage component 312. A join component 320 reads data from multiple data sources in a sequence and arranges the input data into a sequence of discrete work units. The work units are then passed in sequence to the next component in the dataflow graph.

Since the next data processing component in the dataflow graph is a parallel component, the work units are partitioned and allocated to multiple component instances by a work unit partition component 330. In this example, the allocation of work units among the instances is consistent between different batch processing runs, so that the instances do not need to access state information for work units allocated to other instances. The work unit partition component 330 assigns work units to particular instances based on a consistent algorithm that may be repeated with consistent results if a fault conditions occurs and the batch needs to run again. For example, the work unit allocation partition component 330 may simply allocate work units one at a time to each component instance in turn, looping to the first instance when the work unit count exceeds the number of parallel instances. In another example, the work unit partition component 330 may apply a partition algorithm that is not guaranteed to yield consistent allocations between runs and save the allocation information to nonvolatile memory, so that the same allocation may be repeated if a repeat run the of the batch is required.

Each instance 331, 332, 333 of the checkpointed parallel component independently processes the work units allocated to it using the methods described in relation the checkpointed component 130 of FIG. 1. Each instance 331, 332, 333 creates and maintains its own checkpoint buffer in non-volatile memory. When a work unit is processed an instance checks its own checkpoint buffer to determine if the work unit has been previously processed during a prior run of the batch. In the exemplary system 300, the checkpointed parallel component includes the action of communicating with a remote server 350 to acquire information for each work unit. In other examples, the checkpointed parallel component may include other actions that have a high cost associated with them that justify the maintenance of a checkpoint buffer for fault tolerance.

When processing of a work unit is completed the results are passed to a gather component 338 that collects results from multiple instances and passes them to the next data processing component in the dataflow graph.

The data processing component 340 is a component without checkpointing. In other examples, any number of components in the dataflow graph can include checkpointing. In some cases it is advantageous to limit checkpoint processing to components in which costly actions are performed. Other dataflow graphs could include more or fewer data processing components with or without parallelism for any given data processing component.

As work units make their way through the components of the dataflow graph, the final results associated with each work unit are transferred to a data sink 360. The batch processing ends when the results for all work units in the batch have been transferred to the data sink 360. At this point, the processes associated with the components in the dataflow graph may be terminated. A checkpoint process for a given instance may delete its checkpoint buffer as part of its termination routine.

FIG. 4 is a block diagram of an exemplary data processing system 400 in which in which a dataflow graph implementing the system 400 includes a parallel component with centralized checkpoint processing. In this example, multiple instances 431, 432, 433 of a checkpointed parallel component are explicitly depicted. An instance of the parallelized component is run on each processing device and each instance processes a subset of the work units in a batch. In this example of a centralized checkpointing approach, a checkpoint manager 436 handles at least some of the checkpoint processing in communication with each of the three instances of the parallel component. The checkpoint manager 436 can be run on one of the processing devices that is running an instance of the parallel component or on an separate processing device.

When processing of a batch of data is started, input data records are read from the data storage components 410 and 412. A join component 420 reads data from multiple data sources in a sequence and arranges the input data into a sequence of discrete work units stored. The work units are then passed in sequence to the next component in the dataflow graph, which in this example is a checkpointed parallel component.

In the example of FIG. 4, the checkpoint manager 436 controls access to a single checkpoint buffer that is shared by the instances 431, 432, 433 each running on a different processing device. Sharing a single checkpoint buffer for all work units in a batch allows the work units to be dynamically allocated to the instances without needing to match the allocation from a previous run of the batch. The shared checkpoint buffer is stored on a shared non-volatile memory 435 that all the instances can access either directly via a bus or communications network, or indirectly via communications with the checkpoint manager 436. The instances 431, 432, 433 may read the shared non-volatile memory 435 to check the checkpoint buffer when they processes a work unit. If results for the current work unit are found in the checkpoint buffer, the stored result is used to avoid repeating the high cost action. If results for the current work unit are not found in the checkpoint buffer, the action for the work unit is executed and the result is stored in the checkpoint buffer. To write to the checkpoint buffer, the instances 431, 432, 433 send a write request message to the checkpoint manager 436. The checkpoint manager 436 then writes to the shared non-volatile memory 435 to update the checkpoint buffer. In an alternative embodiment, the checkpoint manager 436 sends a token to requesting instance that gives it permission to write to the shared non-volatile memory 435 in order to update the checkpoint buffer.

Because a shared checkpoint buffer is used by all the instances 431, 432, 433, the work unit partition component 430 may dynamically allocate work units between the instances differently during each run of a batch of data. For example, the work unit partition component 430 may allocate each work unit dynamically based on available capacity on each processing device at run time, which may vary from run to run. This method also allows the work unit partition component 430 to use different numbers of parallel instances. For example, after a fault condition one of the processing devices running an instance of the parallel component, such as instance 433 may be disabled or otherwise unavailable. In this case when the batch is restarted, the work unit partition component 430 may allocate all of the work units to the remaining instances 431, 432, which may seamlessly access checkpoint buffer entries for work units previously processed by the disabled instance 433.

The checkpoint manager 436 may be implemented by a process running on a separate processing device or it may be a implemented by a process running on one of the processing devices that is running an instance of the parallel component. The instances 431, 432, 433 may buffer checkpoint buffer updates in local volatile memory between checkpoint buffer update events. The checkpoint manager 436 may send signals to the instances that trigger an instance to initiate a checkpoint buffer update with any information buffered in volatile memory.

When processing of a work unit is completed the results are passed to a gather component 438 that collects results from multiple instances and passes them to the next data processing component in the dataflow graph.

The data processing component 440 is a component without checkpointing. In other examples, any number of components in the dataflow graph can include checkpointing. In some cases it is advantageous to limit checkpoint processing to components in which costly actions are performed. Other dataflow graphs could include more or fewer processing components with or without parallelism for any given data processing component.

As work units make their way through the components of the dataflow graph, the final results associated with each work unit are transferred to a data sink 460. The batch processing ends when the results for all work units in the batch have been transferred to the data sink 460. At this point, the components in the dataflow graph may be terminated. The checkpoint manager 436 may delete the checkpoint buffer as part of its termination routine.

The fault tolerant batch processing approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for processing a batch of input data in a fault tolerant manner, the method including:
reading a batch of input data including a plurality of records from one or more data sources; and
passing the batch through a dataflow graph including two or more nodes representing components connected by links representing flows of data between the components, wherein at least one but fewer than all of the components includes a checkpoint process for an action performed for each of multiple units of work associated with one or more of the records;
wherein the checkpoint process includes:
opening a checkpoint buffer stored in non-volatile memory at the start of processing for the batch;
for each unit of work from the batch, checking if a result from performing the action for the unit of work was previously saved in the checkpoint buffer; and
for each unit of work from the batch, if a result from performing the action for the unit of work was previously saved in the checkpoint buffer, using the saved result to complete processing of the unit of work without performing the action again, or if a result from performing the action for the unit of work is not saved in the checkpoint buffer, performing the action to complete processing of the unit of work and saving the result from performing the action in the checkpoint buffer.

2. The method of claim 1, wherein the action includes communicating with a remote server.

3. The method of claim 2, wherein the result from performing the action includes information from communication with the remote server for the unit of work.

4. The method of claim 2, wherein communications with the remote server are tolled.

5. The method of claim 2, wherein the results of communications with the remote server are stored in volatile memory and saved to the checkpoint buffer in groups upon the occurrence of trigger events.

6. The method of claim 5, wherein the trigger event is a signal from a checkpoint manager.

7. The method of claim 5, wherein the trigger event is the processing of a number of records since the last write to the checkpoint buffer.

8. The method of claim 5, wherein the trigger event is the elapse of a period of time since the last write to the checkpoint buffer.

9. The method of claim 1, further including deleting the checkpoint buffer when the processing of the batch is complete.

10. The method of claim 1, wherein a component that includes the checkpoint process runs on a plurality of processing devices in parallel.

11. The method of claim 10, wherein the allocation of data records among the plurality of parallel processing devices is consistent between runs of the batch and each processing device maintains an independent checkpoint buffer.

12. The method of claim 10, wherein the allocation of data records among the plurality of parallel processing devices is dynamic and the processing devices share access to a single checkpoint buffer stored in shared non-volatile memory with writes to the checkpoint buffer controlled by a checkpoint manager.

13. The method of claim 1, further including:
restarting all the components in the dataflow graph after a fault condition has occurred;
reading the batch of input data including a plurality of records from one or more data sources; and
passing the entire batch through the dataflow graph.

14. The method of claim 13, wherein the action includes communicating with a remote server.

15. A computer-readable medium storing, in a non-transitory form, a computer program for processing a batch of input data in a fault tolerant manner, the computer program including instructions for causing a computer to:
read a batch of input data including a plurality of records from one or more data sources; and
pass the batch through a dataflow graph including two or more nodes representing components connected by links representing flows of data between the components, wherein at least one but fewer than all of the components includes a checkpoint process for an action performed for each of multiple units of work associated with one or more of the records;
wherein the checkpoint process further includes:
opening a checkpoint buffer stored in non-volatile memory at the start of processing for the batch;
for each unit of work from the batch, checking if a result from performing the action for the unit of work was previously saved in the checkpoint buffer; and
for each unit of work from the batch, if a result from performing the action for the unit of work was previously saved in the checkpoint buffer, using the saved result to complete processing of the unit of work without performing the action again, or if a result from performing the action for the unit of work is not saved in the checkpoint buffer, performing the action to complete processing of the unit of work and saving the result from performing the action in the checkpoint buffer.

16. A system for processing a batch of input data in a fault tolerant manner, the system including:
means for receiving a batch of input data including a plurality of records from one or more data sources; and
means for passing the batch through a dataflow graph including two or more nodes representing components connected by links representing flows of data between the components, wherein at least one but fewer than all of the components includes a checkpoint process for an action performed for each of multiple units of work associated with one or more of the records;
wherein the checkpoint process includes:
opening a checkpoint buffer stored in non-volatile memory at the start of processing for the batch;
for each unit of work from the batch, checking if a result from performing the action for the unit of work was previously saved in the checkpoint buffer; and
for each unit of work from the batch, if a result from performing the action for the unit of work was previously saved in the checkpoint buffer, using the saved result to complete processing of the unit of work without performing the action again, or if a result from performing the action for the unit of work is not saved in the checkpoint buffer, performing the action to complete processing of the unit of work and saving the result from performing the action in the checkpoint buffer.

* * * * *